(12) United States Patent
Ishida

(10) Patent No.: US 7,183,356 B2
(45) Date of Patent: Feb. 27, 2007

(54) FLUORORESIN POWDER COATING COMPOSITION

(75) Inventor: Toru Ishida, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 372 days.

(21) Appl. No.: 10/807,166

(22) Filed: Mar. 24, 2004

(65) Prior Publication Data

US 2004/0176554 A1   Sep. 9, 2004

Related U.S. Application Data

(63) Continuation of application No. PCT/JP02/10995, filed on Oct. 23, 2002.

(30) Foreign Application Priority Data

Oct. 23, 2001  (JP) .......................... 2001-324668

(51) Int. Cl.
  C08F 259/08   (2006.01)
  C08L 15/02    (2006.01)

(52) U.S. Cl. .................. 525/199; 525/276; 525/326.2; 525/326.3; 525/243; 523/201; 523/331; 523/340; 524/520

(58) Field of Classification Search ................ 525/199, 525/276, 326.2, 326.3, 243; 523/201, 331, 523/340; 524/520

See application file for complete search history.

(56) References Cited

U.S. PATENT DOCUMENTS

| | | | |
|---|---|---|---|
| 3,758,634 A | | 9/1973 | Labana et al. |
| 5,030,667 A | | 7/1991 | Shimizu et al. |
| 5,147,934 A | | 9/1992 | Ito et al. |
| 5,439,896 A | | 8/1995 | Ito et al. |
| 5,576,106 A | * | 11/1996 | Kerbow et al. ............ 428/403 |
| 6,232,372 B1 | * | 5/2001 | Brothers et al. ............ 523/206 |
| 6,680,357 B1 | * | 1/2004 | Hedhli et al. ............ 525/326.2 |
| 2001/0007714 A1 | | 7/2001 | Gaboury et al. |

FOREIGN PATENT DOCUMENTS

| | | |
|---|---|---|
| EP | 0 393 480 A1 | 10/1990 |
| EP | 1 118 632 A2 | 7/2001 |
| JP | 48-28550 | 4/1973 |
| JP | 50-51539 | 5/1975 |
| JP | 51-57725 | 5/1976 |
| JP | 51-82321 | 7/1976 |
| JP | 59-102962 | 6/1984 |
| JP | 60-21667 | 5/1985 |
| JP | 61-57609 | 3/1986 |
| JP | 63-264675 | 11/1988 |
| JP | 1-103670 | 4/1989 |
| JP | 2-60968 | 3/1990 |
| JP | 2-132101 | 5/1990 |
| JP | 6-345822 | 12/1994 |
| JP | 7-145332 | 6/1995 |
| JP | 2001-152082 | 8/2001 |
| JP | 2002-20409 | 1/2002 |
| JP | 2002-179871 | 6/2002 |
| JP | 2002-201227 | 7/2002 |
| JP | 2002-226764 | 8/2002 |
| WO | WO00/11094 | 3/2000 |
| WO | WO 01/10641 A1 | 2/2001 |

OTHER PUBLICATIONS

U.S. Appl. No. 10/893,347, filed Jul. 19, 2004, Yamauchi, et al.
U.S. Appl. No. 10/807,166, filed Mar. 24, 2004, Ishida.

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A fluororesin powder coating composition having high light resistance and being excellent in blocking resistance and smoothness of the coating film when coated, and a fluororesin powder to be used for a powder coating material, are presented.

The fluororesin powder coating composition is made by using as the main material resin a composite fluorinated copolymer powder having a core/shell structure wherein core particles are made of a fluorinated copolymer and their surfaces are covered by e.g. a (meth)acrylate resin having a glass transition temperature higher than that of the core particles. The core/shell structure is formed by seed polymerization wherein fluorinated polymer particles are used as seeds.

18 Claims, No Drawings

FLUORORESIN POWDER COATING COMPOSITION

TECHNICAL FIELD

The present invention relates to a fluororesin powder coating composition comprising a fluorinated copolymer. More particularly, it relates to a fluororesin powder coating composition which has high weather resistance, is inexpensive and has good smoothness of the coating film when coated and which is excellent in blocking resistance during its storage.

BACKGROUND ART

A thermoplastic dispersion type fluororesin coating material composed mainly of a polyvinylidene fluoride or a solvent soluble type thermosetting fluororesin coating material composed mainly of a copolymer of a fluororesin with a vinyl ether or a vinyl ester, has been widely used in recent years in the coating material field e.g. for heavy duty corrosion prevention, building or industrial application by virtue of corrosion resistance, weather resistance, durability, stain-removal properties, etc. of the coating film (e.g. JP-B-60-21667, JP-A-59-102962, JP-A-61-57609, etc.).

Further, in view of an environmental pollution problem which has been increasingly serious year after year, a powder fluororesin coating material which is a non-solvent type coating material having the discharge amount of an organic solvent (VOC) reduced, has been proposed (e.g. JP-A-1-103670, JP-A-2-60968, JP-A-6-345822, JP-A-7-145332, etc.).

Usually, a powder coating material is produced by producing and then roughly pulverizing the main material resin, dry blending a curing agent or various additives thereto, followed by melt-kneading, repulverization and classification.

A fluororesin coating material is excellent in weather resistance, etc, as mentioned above, but the glass transition temperature (hereinafter sometimes referred to simply as Tg) of the fluororesin to be used as the main material resin is relatively low at a level of from −40 to 50° C. in many cases. If Tg is low like this, there will be a problem that blocks will form during the storage of the powder coating material, i.e. blocking will result. Whereas, it has been proposed to obtain a fluororesin having high Tg by copolymerizing a monomer such as vinyl benzoate. However, if Tg is made too high, the melting temperature at the time of coating will be too high, thus causing another problem such that smoothness of the coating film will be impaired. Further, a monomer such as vinyl benzoate is expensive thus leading to an increase of the cost, and if this proportion is made large, the weather resistance decreases.

It is an object of the present invention to solve such problems of the prior art and to provide a fluororesin powder coating composition excellent in both smoothness of the coating film when coated and storage stability, without impairing the characteristics such as weather resistance inherent to a fluororesin coating material.

DISCLOSURE OF THE INVENTION

The present invention has been made to solve the above-mentioned problems, and the present invention provides a fluororesin powder coating composition characterized by comprising a composite fluorinated copolymer (A) having a core/shell structure wherein core particles are made of a fluorinated copolymer (A'), and their surfaces are covered with a resin having a glass transition temperature higher than that of the core particles, constituting shells.

Further, the present invention provides particles for a powder coating material, made of a composite fluorinated copolymer (A) having a core/shell structure wherein core particles are made of a fluorinated copolymer (A'), and their surfaces are covered with a resin having a glass transition temperature higher than that of the core particles, constituting shells.

BEST MODE FOR CARRYING OUT THE INVENTION

Core Particles

Now, preferred embodiments of the present invention will be described in detail.

The fluorinated copolymer (A') constituting the core particles in the fluororesin powder coating composition of the present invention is basically preferably a fluorinated copolymer containing polymerized units based on (a) a fluoroolefin.

The fluoroolefin (a) may be a $C_{2-4}$ fluoroolefin containing fluorine atoms, such as trifluoroethylene, chlorotrifluoroethylene, vinylidene fluoride, tetrafluoroethylene, trifluoropropylene, tetrafluoropropylene, pentafluoropropylene, hexafluoropropylene, tetrafluorobutylene or pentafluorobutylene, particularly preferably a perfluoroolefin. Most preferred is tetrafluoroethylene. Further, it may contain together with fluorine atoms other halogen atoms such as chlorine atoms.

The above fluoroolefins may be used alone or in combination of two or more of them. Further, together with such a fluoroolefin, a monomer copolymerizable therewith, for example, ethylene, propylene, butylene such as 1-butylene, 2-butylene or isobutylene, styrene or α-methyl styrene, may also be used within a range to satisfy the purpose of the present invention, particularly the requirement for the prescribed Tg. Further, other monomers such as a vinyl ester, a vinyl ether, an isopropenyl ether, a (meth)acrylate, a crotonate, allyl ether, etc., may be used in a proportion of at most 50 mol %, preferably at most 30 mol %, more preferably at most 20 mol %, of the fluorinated copolymer.

Further, the content of fluorine atoms in the fluorinated copolymer (A') in the present invention, is preferably within a range of from about 10 to 60 mass %.

Shells

In the present invention, core particles are made of a fluorinated copolymer (A') containing polymerized units based on the above fluoroolefin or the like, and their surfaces are covered by a resin having a Tg higher than that of the core particles, constituting shells, to form a composite fluorinated copolymer (A) having a core/shell structure.

Here, Tg of the core particles is preferably from −40 to 50° C., more preferably from −20 to 40° C. Whereas, Tg of the resin constituting the shells is preferably from 60 to 150° C., more preferably from 70 to 130° C. If Tg of the core particles is too low, the pulverization property at the time of forming a coating composition tends to be poor, and if it is too high, smoothness of the coating film tends to deteriorate. Whereas if Tg of the resin constituting the shells is too low, blocking is likely to take place, and if it is too high, flexibility of the coating film tends to be lost.

In the present invention, Tg is one obtained as a point where two tangent lines cross each other at a portion where the temperature gradient undergoes an abrupt change in a temperature rising curve obtained by heating a sample of the resin constituting the core particles or shells at a rate of 10° C./min by a scanning differential calorimeter (DSC).

Further, in the case of a copolymer, it can approximately be calculated by the formula (1).

$$Tg_{av}=Tg_1X_1+Tg_2X_2+\ldots+Tg_iX_i \quad (1)$$

In the formula (1), $Tg_{av}$, $Tg_i$ and $X_i$ have the following meanings, respectively.

$Tg_{av}$: the average value of the glass transition temperature of the copolymer $Tg_i$: the glass transition temperature of the homopolymer of monomer component i $X_i$: the mass fraction of monomer component i The resin constituting the shells is not particularly limited, so long as it satisfies the above-mentioned requirement of Tg. For example, it may be a polyester resin or a (meth) acrylate resin. It is particularly preferably a (meth)acrylate resin from the viewpoint of the availability, handling efficiency, etc.

Such a (meth)acrylate may, for example, be methyl (meth) acrylate, ethyl (meth)acrylate, propyl (meth)acrylate, n-butyl (meth)acrylate, isobutyl (meth)acrylate, t-butyl (meth) acrylate, n-amyl (meth)acrylate, isoamyl (meth)acrylate, n-hexyl (meth)acrylate, isohexyl (meth)acrylate, 2-ethylhexyl (meth)acrylate or lauryl (meth)acrylate.

The above (meth)acrylates may be used alone or as a mixture of two or more of them. Further, together with such a (meth)acrylate, a monomer copolymerizable therewith, such as ethylene, propylene, a butylene such as 1-butylene, 2-butylene or isobutylene, styrene or α-methyl styrene may be used within a range to satisfy the purpose of the present invention, particularly the prescribed requirement for Tg. Further, other monomers such as vinyl ester, vinyl ether, isopropenyl ether, a crotonate or allyl ether, may, for example, be used in a proportion of at most 50 mol %, preferably at most 30 mol %, more preferably at most 20 mol %, of the (meth)acrylate resin.

In the core/shell structure in the present invention, it is not necessarily required to completely cover the entire surfaces of the core particles with the shell resin without space, and the surfaces may be partially or spottedly covered (coated). The core/shell structure of the present invention has such a significance.

It is also preferred to introduce mutually reactive functional groups to the resin constituting cores and to the resin constituting shells, respectively, to make bonds at the interface between cores and shells, in order to form the core/shell structure in the composite fluorinated copolymer (A) more secure and firm thereby to prevent separation or disintegration of the core/shell structure at the time of melting in the after-mentioned process for forming a coating material.

Introduction of Functional Groups to the Core Particles

In order to introduce functional groups to the fluorinated copolymer (A') constituting the cores, a polymer is made so that it contains not only polymerized units based on (a) a fluoroolefin but also polymerized units based on (b) a vinyl monomer having a reactive group.

Here, the reactive group is preferably at least one functional group selected from the group consisting of a carboxyl group, an epoxy group, a hydrolysable silyl group, a hydroxyl group and an amino group.

Among such vinyl monomers having (b) a reactive group, the monomer having a carboxyl group may, for example, be a monomer having a carboxyl group such as an unsaturated fatty acid such as acrylic acid, methacrylic acid, crotonic acid, isocrotonic acid, 10-undecenoic acid (undecylenic acid), 9-octadecenoic acid (oleic acid), 9-octadecenoic acid (oleic acid), fumaric acid or maleic acid, or a carboxyl group-containing monomer of the formula (2) or (3):

$$CH_2=CHOR^1OCOR^2COOM \quad (2)$$

$$CH_2=CHCH_2OR^3OCOR^4COOM \quad (3)$$

wherein each of $R^1$ and $R^3$ is a $C_{2-15}$ bivalent hydrocarbon group, each of $R^2$ and $R^4$ is a saturated or unsaturated, linear or cyclic bivalent hydrocarbon group, and M is a hydrogen atom, a hydrocarbon group, an alkali metal or a nitrogen atom-containing compound.

Among them, 10-undecenoic acid is preferred, since it has good copolymerizability with a fluoroolefin.

Further, the monomer containing an epoxy group may, for example, be an epoxy group-containing alkyl vinyl ether such as glycidyl vinyl ether; an epoxy group-containing alkyl allyl ether such as glycidyl allyl ether; an epoxy group-containing alkyl acrylate or methacrylate, such as glycidyl acrylate or glycidyl methacrylate.

The monomer containing a hydrolysable silyl group may, for example, be a hydrolysable silyl group-containing ester such as trimethoxy vinyl silane, triethoxy vinyl silane, γ-(meth)acryloyloxypropyltrimethoxysilane, γ-(meth)acryloyloxypropyltriethoxysilane, γ-(meth)acryloyloxypropylmethyldimethoxysilane or γ-(meth)acryloyloxypropyltriisopropenyloxysilane. A polymerized unit containing a hydrolysable silyl group may be introduced by copolymerizing such a monomer containing a hydrolysable silyl group.

The monomer having a hydroxyl group may, for example, be 2-hydroxyethyl vinyl ether, 4-hydroxybutyl vinyl ether, 2-hydroxyethyl crotonate, 2-hydroxyethyl allyl ether, allyl alcohol, 2-hydroxyethyl (meth)acrylate, hydroxylpropyl (meth)acrylate or 4-hydroxybutyl (meth)acrylate. Further, the monomer containing an amino group may, for example, be diethylaminoethyl (meth)acrylate, or dimethylaminoethyl (meth)acrylate.

The amount of (b) the vinyl monomer having a reactive group is at most 50 mol %, preferably at most 30 mol %, more preferably at most 20 mol % and at least 1%, of the fluorinated copolymer (A').

Introduction of Functional Groups to Shells

In order to introduce functional groups to the resin constituting shells, a radical polymerizable monomer mixture is used which comprises (e) a (meth)acrylate having a reactive group which reacts with the reactive group of the above (b), to form a bond.

Like in the above case, the reactive group is preferably one selected from the group consisting of a carboxyl group, an epoxy group, a hydrolysable silyl group, a hydroxyl group and an amino group.

One containing a carboxyl group may, for example, be an ester of an oxycarboxylic acid with (meth)acrylic acid, such as 2-carboxylethyl (meth)acrylate. One containing an epoxy group may be glycidyl (meth)acrylate. Further, one containing a hydrolysable silyl group may, for example, be γ-(meth) acryloyltrimethoxysilane, γ-(meth)acryloyltriethoxysilane, γ-(meth)acryloyloxypropyltrimethoxysilane, γ-(meth)acryloyloxypropyltriethoxysilane, γ-(meth)acryloyloxypropylmethyldimethoxysilane or γ-(meth)acryloyloxypropyltriisopropenyloxysilane.

One containing a hydroxyl group may, for example, be 2-hydroxyethyl (meth)acrylate, hydroxypropyl (meth)acrylate or 4-hydroxybutyl (meth)acrylate. One containing an amino group may, for example, be diethylaminoethyl (meth) acrylate or dimethylaminoethyl (meth)acrylate.

The combination of the reactive group of (b) in the fluorinated copolymer (A') constituting the core particles and the reactive group of (e) of the resin constituting shells (hereinafter both may sometimes be referred to as bonding functional groups) may be any combination so long as it is a combination whereby a bond will be formed. For example, to a carboxyl group, an epoxy group, a hydroxyl group or an amino group is preferred, and to a hydrolysable silyl group, a hydrolysable silyl group is preferred.

The equivalent ratio of the reactive group of (b):the reactive group of (e) is preferably from 1:2 to 2:1, particularly preferably substantially 1:1.

The proportion of the (meth)acrylate having a reactive group in the radical polymerizable monomer mixture is at most 60 mol %, preferably at most 50%, more preferably at most 40% and at least 1%.

In the present invention, a composite fluorinated copolymer (A) having a core/shell structure is one obtained by (I) carrying out a step (hereinafter sometimes referred to as "the composite step") of obtaining an aqueous dispersion of a composite fluorinated copolymer (A) by emulsion-polymerizing a monomer mixture comprising (d) a (meth)acrylate in the presence of a fluorinated copolymer (A') containing polymerized units based on (a) a fluoroolefin, specifically in the aqueous dispersion thereof, and (II) separating the composite fluorinated copolymer (A) from the aqueous dispersion and drying it (hereinafter sometimes referred to as "the separation and drying step"). Further, in the present invention, the composite fluorinated copolymer (A) having a core/shell structure containing bonding functional groups is likewise one obtained by (I) carrying out a step (the composite step) of obtaining an aqueous dispersion of a composite fluorinated copolymer (A) containing bonding functional groups, by emulsion-polymerizing a radical polymerizable monomer mixture comprising (e) a (meth) acrylate having a reactive group which reacts with the reactive group of the above (b) to form a bond, in the presence of a fluorinated copolymer (A') containing polymerized units based on (a) a fluoroolefin and polymerized units based on (b) a vinyl monomer having a reactive group, namely in an aqueous dispersion thereof, and (II) separating the composite fluorinated copolymer (A) from the aqueous dispersion and drying it (the separation and drying step).

Composite Step

In the present invention, in the emulsion polymerization to prepare an aqueous dispersion of the fluorinated copolymer (A') for core particles and in the emulsion polymerization for a monomer mixture comprising a (meth)acrylate in the presence of the core particles in the composite step, initiation of the emulsion polymerization is carried out by an addition of a polymerization initiator in the same manner as in the initiation of usual emulsion polymerization.

As the polymerization initiator, a usual radical initiator may be employed, but a water-soluble initiator is particularly preferably employed. Specifically, a persulfate such as ammonium persulfate (APS), hydrogen peroxide, or a redox initiator being a combination thereof with a reducing agent such as sodium hydrogen sulfite or sodium thiosulfate, or an inorganic initiator of a system wherein a small amount of iron, a ferrous salt or silver sulfate is coexistent therewith, or an organic initiator such as a dibasic acid peroxide such as disuccinic acid peroxide or diglutaric acid peroxide, a hydrochloride of azobisisobutylamidine or azobisisobutyronitrile, may, for example, be mentioned.

As the emulsifier, a nonionic emulsifier and an anionic emulsifier may be employed alone or in combination. The nonionic emulsifier may, for example, be an alkylphenol-ethylene oxide adduct, a higher alcohol ethylene oxide adduct, or a block copolymer of ethylene oxide and propylene oxide, and the anionic surfactant may, for example, be an alkylbenzene sulfonate, an alkylnaphthalene sulfonate, a higher fatty acid salt, an alkyl sulfate, an alkylether sulfate, or a phosphoric acid ester salt.

Further, as the polymerization operation, it is preferred that after carrying out the emulsion polymerization to obtain an aqueous dispersion of the fluorinated copolymer (A), a (meth)acrylate monomer or the like is further supplied to the aqueous dispersion to continuously carry out seed polymerization.

The amount of the polymerization initiator to be used, may suitably be changed depending upon its type, the emulsion polymerization conditions, etc. However, usually, it is from 0.005 to 0.5 parts by mass, per 100 parts by mass of the monomer to be emulsion-polymerized. Further, such a polymerization initiator may be added all at once, but it may be added dividedly, as the case requires.

Further, for the purpose of increasing the pH of the emulsified product, a pH controlling agent may be employed. The pH controlling agent may, for example, be an inorganic base such as sodium carbonate, potassium carbonate, sodium hydrogen orthophosphate, sodium thiosulfate, or sodium tetraborate, or an organic base such as triethylamine, triethanolamine, dimethylethanolamine or diethylethanolamine.

The amount of the pH controlling agent is usually from about 0.05 to 2 parts by mass, preferably from about 0.1 to 2 parts by mass, per 100 parts by mass of the emulsion polymerization medium.

Further, the initiation temperature for the emulsion polymerization is selected to be the optimum temperature depending upon the type of the polymerization initiator, but usually, a temperature of from 0 to 100° C., particularly preferably a temperature of from 10 to 70° C., is preferably employed. On the other hand, the polymerization temperature is from about 20 to 120° C., particularly preferably from about 30 to 70° C. The polymerization time is from 2 to 60 hours, preferably from 5 to 40 hours. Further, the reaction pressure may be suitably selected, but usually, it is preferred to employ a pressure of from 0.1 to 10 MPa, particularly from about 0.2 to 5 MPa.

The emulsion polymerization operation in the present invention is preferably carried out in a reactor of an agitation tank type equipped with a stirrer, a device for supplying a reaction material such as a monomer, a heating/cooling device, a temperature/pressure controlling device, etc. Additives such as a monomer, water, an emulsifier, a polymerization initiator, etc., may be charged into the reactor all at once for polymerization. Otherwise, pre-emulsifying may be carried out by means of an emulsion agitation apparatus such as a homogenizer, and then, an initiator is added for polymerization. Further, various methods may be employed such as a method of introducing the monomer in its entire amount all at once to the reactor, a method of introducing the entire amount of the monomer dividedly, and a method wherein a part of the monomer is charged and preliminary reacted, and then the rest is dividedly or continuously introduced.

Further, in a case where a gaseous monomer such as tetrafluoroethylene, ethylene or propylene is introduced into the reactor, in order to improve the absorption of the monomer gas in an aqueous solvent, a hydrophilic organic compound such as methanol, ethanol, isopropanol, n-butanol, isobutanol, t-butanol, ethylene glycol or propylene glycol, may added in an amount of from about 0.1 to 10 mass %.

(II) Separation and Drying Step

The present invention is characterized in that from the aqueous dispersion of the composite fluorinated copolymer (A) obtained in the above composite step, the composite fluorinated copolymer (A) is separated and dried for use.

As the means for separation and drying from the aqueous dispersion, various means known per se may be employed. For example, means such as spray drying, freeze drying and salting out drying may be employed. One which can be most efficiently carried out, is salting out drying.

The salting out drying is one wherein an aqueous electrolyte is added to the aqueous dispersion (emulsion), to cause salting out of the emulsifier, thereby to salt out and agglomerate particles of the composite fluorinated copolymer (A), which are then subjected to solid-liquid separation, and the obtained agglomerates are dried.

The aqueous electrolyte to be added, may, for example, be a water-soluble inorganic or organic salt, such as potassium chloride, sodium chloride, calcium chloride, aluminum chloride, calcium carbonate, ammonium carbonate, potassium bromide, sodium acetate, ammonium oxalate, sodium phosphate, ammonium acetate, magnesium sulfate, potassium sulfate, sodium sulfate, calcium sulfate, magnesium sulfate, potassium nitrate or sodium nitrate; an acid such as hydrochloric acid, sulfuric acid, nitric acid, phosphoric acid, carbonic acid, oxalic acid or acetic acid; or a base such as ammonia, potassium hydroxide, sodium hydroxide or calcium hydroxide.

The salting out operation is carried out usually in the reactor wherein the emulsion polymerization reaction was carried out, by adding the electrolyte preferably in the form of its aqueous solution, while stirring the aqueous dispersion. The particle size of particles of the composite fluorinated copolymer (A) salted out, agglomerated and precipitated in the reactor, may be adjusted by changing the concentration, the amount and the adding speed of the water-soluble electrolyte to be added. Here, during the salting out operation, it is preferred to maintain a stirring rate to such an extent that the agglomerates will not precipitate and fix at the bottom of the reactor.

The precipitate of the particles of the composite fluorinated copolymer (A) thus agglomerated and precipitated, is subjected to solid-liquid separation by means of centrifugal separation or filtration separation.

The precipitate is preferably thoroughly washed with water, but particularly preferably, the separated precipitate is again re-dispersed in pure water or deionized water and again subjected to separation by filtration, and such an operation is repeated from 2 to 10 times, preferably from 3 to 6 times, whereby the surfactant, added electrolytes, etc. will be completely removed by washing.

The precipitate of the particles of the composite fluorinated copolymer (A) thus thoroughly washed with water, is dried in a suitable drier. The drying temperature is usually from 40 to 80° C., preferably from 45 to 70° C., and the drying time may vary depending upon e.g. the drying temperature, but it is usually from 2 to 20 hours, preferably from 5 to 15 hours.

The particles of the composite fluorinated copolymer (A) having a core/shell structure, thus obtained in the form of a dried powder, are used as they are or after roughly pulverized, to form a fluororesin powder coating composition of the present invention comprising such particles. In such a case, the dried powder may be roughly pulverized. The mass ratio of the composite fluorinated copolymer (A)/the resin constituting the shells, is preferably from 100/5 to 100/100, more preferably from 100/10 to 100/50. Further, the particle size of the powder is usually from about 1 to 500 µm, preferably from about 10 to 100 µm.

The powder coating composition of the present invention is basically one comprising the fluorinated copolymer (A) as the main material resin i.e. as the coating material base. However, as the case requires, various additives, such as a surface smoothing agent, a foaming suppressing agent, a silane coupling agent, an ultraviolet absorber, a photostabilizer, an antioxidant, a coloring pigment, a metallic pigment, an extender pigment, etc., may be incorporated within a range not to impair the purpose of the present invention. Further, together with the fluorinated copolymer (A), a known resin which is commonly employed in a coating composition, such as an acrylic resin, a polyester resin, an alkyd resin, an amino resin, an epoxy resin or a polyurethane resin may be used in combination.

In the present invention, it is also possible to introduce curable functional groups to the composite fluorinated copolymer (A) having a core/shell structure to obtain a heat curable powder coating composition. As the curable functional groups, carboxyl groups, epoxy groups, hydrolysable silyl groups, hydroxyl groups or amino groups may, for example, be mentioned. Such functional groups may be introduced by using (b) a vinyl monomer having a reactive group or (e) a (meth)acrylate having a reactive group in an amount more than equivalent to form bonds between the cores and shells. Otherwise, they may be introduced by copolymerizing a monomer having the above-mentioned curable functional group at the time of forming the core particles and/or the shell resin.

Further, as a curing agent in the fluororesin powder coating composition of the present invention, one commonly used, may be employed. It may, for example, be a blocked isocyanate compound, for example, a blocked isocyanate compound having isocyanate groups of an isocyanate compound, such as a polyisocyanate compound such as isophorone diisocyanate, tolylene diisocyanate, xylylene diisocyanate, 4,4'-diphenylmethane diisocyanate or hexamethylene diisocyanate, or a dimer or trimer thereof, or a polyisocyanate compound modified with a polyhydric alcohol such as trimethylol propane, blocked by a blocking agent such as ε-caprolactam, phenol, benzyl alcohol or methyl ethyl ethoxym, a urethdione compound, or a curing agent containing a β-hydroxyalkylamido group, for exmpale, Primid XL-552, manufactured by EMS Showa Denko K.K. or triglycidyl isocyanurate (TGIC).

In the present invention, the fluorinated copolymer (A) is mixed (dry blended) together with the above-mentioned various additives and the curing agent in a powder state by e.g. a Henschel mixer, followed by melt kneading by e.g. a single screw or twin screw extrusion kneading machine. The temperature in the extrusion kneading machine is usually at a level of from 100 to 160° C. The melted product thus thoroughly melt-kneaded is extruded into e.g. a sheet, and the extruded product is cooled and pulverized at room temperature.

The particle size distribution after the pulverization is preferably at a level of from 20 to 50 µm for spray coating, or at a level of 70 to 120 µm for fluidized dip coating.

In a case where the fluorinated copolymer (A) powder in the present invention is subjected to melt kneading and pulverization treatment together with the curing agent and various additives as mentioned above, a part of the core/shell structure may sometimes disintegrate or peel. However, according to a study by the present inventors, even in such a case, the core/shell structure is basically maintained, and as compared with a case where the fluorinated copolymer (A') powder and a (meth)acrylate resin powder are merely mixed and melt-kneaded, the blocking resistance during storage of the obtained powder resin composition is improved to a large extent, as shown in the following Examples.

Further, in the present invention, the core/shell structure is more firmly formed by introducing functional groups which mutually react, to the fluorinated copolymer constituting the cores and to the resin constituting the shells, respectively, whereby peeling or disintegration of the core/shell structure is substantially suppressed during melt kneading of the coating composition, and thus, a coating composition superior in the blocking resistance can be presented.

Further, for the purpose of improving the fluidity for preventing blocking of the powder particles of the coating composition, the surface of the particles may be coated with organic and/or inorganic fine particles. As such inorganic fine particles, barium sulfate, calcium carbonate, aluminum oxide, calcium silicate, magnesium silicate, antimony oxide, titanium dioxide, iron oxide or fine powder silica may, for example, be mentioned, and as such organic fine particles, a polyolefin or an acrylic copolymer may, for example, be mentioned.

The fluororesin powder coating composition of the present invention is coated on the substrate to be treated and then heat-treated for baking and curing to form a coating film.

The coating method is not particularly limited, and a conventional method such as electrostatic spray coating (spray coating) or fluidized dip coating may, for example, be employed.

The thickness of the coating film is not particularly limited, but it is usually from 30 to 120 μm as dried thickness. The heat treating temperature is usually from 140 to 200° C., preferably from 150 to 180° C., and the heat treating time is usually from 10 to 60 minutes, preferably from 15 to 30 minutes.

The substrate to be treated with the coating composition of the present invention may, for example, be an iron plate, stainless steel, aluminum or a zinc-treated steel plate, and such a surface may preliminarily treated by chromium phosphate treatment, zinc phosphate treatment or chromate treatment.

EXAMPLES

Now, the present invention will be described in detail with reference to Preparation Examples and Working Examples. However, it should be understood that the present invention is by no means restricted by such Examples. Further, in the following Examples, "parts" means "parts by mass", unless otherwise specified, and "%" means "mass %".

Preparation Example 1

Into an autoclave equipped with a stainless steel stirrer, 280 g of ethyl vinyl ether (EVE), 48 g of Veova 10 (tradename for a vinyl ester, manufactured by Shell Chemical), 20 g of vinyl benzoate, 22 g of 4-hydroxybutyl vinyl ether (HBVE), 1000 g of deionized water, 2.2 g of potassium carbonate ($K_2CO_3$), 0.7 g of ammonium persulfate (APS), 31 g of an emulsifier (N-1110, manufactured by Nippon Nyukazai Co., Ltd.) and 1.0 g of an emulsifier (SLS, manufactured by Nikko Chemicals Co., Ltd.) were charged, and while cooling with ice, nitrogen gas was injected under a pressure of 0.3 MPa for deaeration.

This deaeration under nitrogen pressure was repeated twice, followed by deaeration to remove dissolved air, whereupon 530 g of tetrafluoroethylene (TFE) was charged, followed by a reaction at 30° C. for 12 hours to obtain aqueous dispersion 1 of a fluorinated copolymer having a solid content concentration of 50.2%. Tg of this fluorinated copolymer was 35° C.

Preparation Example 2

Into an autoclave equipped with a stainless steel stirrer, 161 g of ethyl vinyl ether (EVE), 178 g of cyclohexyl vinyl ether (CHVE), 141 g of 4-hydroxybutyl vinyl ether (HBVE), 1000 g of deionized water, 2.2 g of potassium carbonate ($K_2CO_3$), 0.7 g of ammonium persulfate (APS), 31 g of an emulsifier (N-1110, manufactured by Nippon Nyukazai Co., Ltd.) and 1.0 g of an emulsifier (SLS, manufactured by Nikko Chemicals Co., Ltd.) were charged, and while cooling with ice, nitrogen gas was injected under a pressure of 0.3 MPa for deaeration.

This deaeration under nitrogen pressure was repeated twice, followed by deaeration to remove dissolved air, whereupon 482 g of chlorotrifluoroethylene (CTFE) was charged, followed by a reaction at 30° C. for 12 hours to obtain aqueous dispersion 2 of a fluorinated copolymer having a solid content concentration of 50.1%. Tg of this fluorinated copolymer was 30° C.

Preparation Example 3

Into an autoclave equipped with a stainless steel stirrer having an internal capacity of 2 L, 1100 g of deionized water, 4.75 g of a fluorine type anionic emulsifier (FC-143, manufactured by SUMITOMO 3M Limited), 24.7 g of a nonionic emulsifier (N-1110, manufactured by Nippon Nyukazai Co., Ltd.) and 39.8 g of t-butanol were charged, and deaeration by a vacuum pump and pressurizing by nitrogen gas, were repeated to remove air. Then, a monomer mixture comprising tetrafluoroethylene/propylene/ethylene/4-hydroxybutyl vinyl ether in a molar ratio of 80/8/10/2 was introduced at 65° C. until the pressure reached 2.2 MPa.

Then, 7 cc of a 30% aqueous solution of ammonium persulfate was added to initiate the reaction. While maintaining the pressure by pressurizing as the pressure decreased, 630 g of a monomer mixture comprising tetrafluoroethylene/propylene/ethylene=59.1/20.4/20.5 mol % was continuously added to continue the reaction. Further, 33 g of HBVE was added as divided in five times, from an injection tube.

15 Hours later, feeding of the gas mixture was stopped, and the autoclave was cooled with water to room temperature, whereupon an unreacted monomer was purged, and the autoclave was opened to obtain aqueous dispersion 3 having a solid content concentration of 38.5%. Tg of this fluorinated copolymer was 20° C.

Preparation Example 4

Into a pressure resistant reactor equipped with a stirrer and having an internal capacity of 1 L, 500 ml of deionized water, 0.5 g of ammonium perfluorooctanoate, and 0.05 g of polyoxyethylene monostearate (POE40) were charged, and injection of nitrogen and deaeration were repeated to remove dissolved air, whereupon a monomer mixture comprising VdF/TFE/CTFE in a molar ratio of 74/14/12 was introduced at 60° C. until the pressure reached 1.0 MPa.

Then, 0.2 g of ammonium persulfate was charged, and a monomer mixture comprising VdF/TFE/CTFE in a molar ratio of 74/14/12 was continuously supplied so that the inner pressure became constant at 1.0 MPa to carry out the reaction for 30 hours, whereupon the interior was returned to room temperature and atmospheric pressure to obtain aqueous dispersion 4 of a fluorinated copolymer having a solid content concentration of 45.5%. Tg of this fluorinated copolymer was −10° C.

Preparation Example 5

Into an autoclave equipped with a stainless steel stirrer and having an internal capacity of 2.5 L, 860 g of deionized water, 35 g of 10-undecenoic acid, 4.75 g of a fluorine type anionic emulsifier (FC-143, manufactured by SUMITOMO 3M Limited), 2.2 g of a nonionic emulsifier (N-1110, manufactured by Nippon Nyukazai Co., Ltd.) and 46.6 g of t-butanol were charged, and deaeration by a vacuum pump and pressurizing by nitrogen gas, were repeated to remove air. Then, a monomer mixture comprising tetrafluoroethylene/propylene/ethylene=85/5/10 mol %, was introduced until the pressure reached 2.4 MPa.

Then, 2 ml of a 25% aqueous solution of ammonium persulfate was added to initiate the reaction. While maintaining the pressure by pressurizing as the pressure decreased, 550.5 g of a gas mixture comprising tetrafluoroethylene/propylene/ethylene=54/26/20 mol %, was continuously added to continue the reaction. Further, during the reaction, 30 cc of a 25% aqueous solution of ammonium persulfate was continuously added.

18 Hours later, feeding of the gas mixture was stopped, and the autoclave was cooled with ice to room temperature, whereupon an unreacted monomer was purged, and the autoclave was opened to obtain aqueous dispersion 5 having a fluorinated copolymer having a solid content concentration of 40.1 mass %. Tg of this fluorinated copolymer was 20° C.

Preparation Example 6

Preparation of Composite Fluorinated Copolymer

Into a glass flask equipped with a thermometer, a stirrer and a reflux condenser and having an internal capacity of 200 ml, 70 g of the aqueous dispersion (aqueous dispersion 1) obtained in Preparation Example 1 was charged and heated to 80° C.

When the temperature reached 80° C., an aqueous dispersion having 1.2 g of methyl methacrylate, 9.4 g of t-butyl methacrylate, 1.0 g of 2-hydroxyethyl methacrylate (Tg of this methacrylate copolymer, as calculated, is 114° C.), and 0.02 g of an anionic emulsifier (sodium lauryl sulfate), emulsified with a 50 mass % aqueous solution, was dropwise added over a period of one hour. After dispersing with stirring for 18 hours, the temperature was raised to 60° C.

When the temperature reached 60° C., 1 ml of a 0.5 mass % aqueous solution of ammonium persulfate was added to initiate the reaction, and acryl seed polymerization was carried out in the presence of the aqueous dispersion of the fluorinated copolymer. After a reaction time of 4.5 hours, an aqueous dispersion of a composite fluorinated copolymer comprising fluorinated copolymer particles as cores and a methacrylate resin as shells (the mass ratio of the fluorinated copolymer to the methacrylate resin is 77:23, and the solid content concentration: 50. mass %) was obtained.

Here, Tg of the (meth)acrylate resin was calculated by the formula (1) (the same applies hereinafter).

Preparation Examples 7 to 10

An aqueous dispersion of a composite fluorinated copolymer was obtained by carrying out polymerization in the same manner as in Preparation Example 6 except that the copolymerization compositional ratio of the methacrylate and the mass ratio of the fluorinated copolymer to the methacrylate resin were changed as shown in Table 1.

Preparation Example 11

Firstly, preparation of an aqueous dispersion of a methacrylate copolymer to be used for mixing treatment with an aqueous dispersion of a fluorinated copolymer was carried out.

Into a glass flask equipped with a thermometer, a stirrer and a reflux condenser and having an internal capacity of 300 ml, 150 g of deionized water, 0.04 g of a nonionic emulsifier (N-1110, manufactured by Nippon Nyukazai Co., Ltd.) and 0.02 g of an anionic emulsifier (sodium lauryl sulfate) were charged and heated to 80° C. When the temperature reached 80° C., a mixed solution comprising 121.5 g of t-butyl methacrylate, 15.6 g of methyl methacrylate, and 12.9 g of 2-hydroxyethyl methacrylate, was dropwise added over a period of one hour. Immediately thereafter, 3 ml of a 2 mass % aqueous solution of ammonium persulfate was added to initiate the reaction. After a reaction time of 3 hours, the internal temperature of the flask was raised to 90° C., and the reaction was further continued for one hour to complete the polymerization thereby to obtain an aqueous dispersion of a methacrylate copolymer. To 30 g of this aqueous dispersion (containing 15 g of the methacrylate copolymer), 100 g of the aqueous dispersion obtained in Preparation Example 1 (containing 50.2 g of the fluorinated copolymer) was mixed to obtain an aqueous dispersion having the methacrylate copolymer and the fluorinated copolymer mixed.

TABLE 1

| | Preparation Example No. | | | | | |
|---|---|---|---|---|---|---|
| | 6 | 7 | 8 | 9 | 10 | 11 |
| Aqueous dispersion of fluorinated copolymer | Dispersion 1 | Dispersion 2 | Dispersion 3 | Dispersion 4 | Dispersion 5 | Dispersion 6 |
| Methacrylate monomers (%) | | | | | | |

TABLE 1-continued

| | Preparation Example No. | | | | | |
|---|---|---|---|---|---|---|
| | 6 | 7 | 8 | 9 | 10 | 11 |
| t-butyl methacrylate | 81.0 | 36.2 | 88.4 | 12.6 | 88.7 | 81.0 |
| n-butyl methacrylate | | 19.0 | | | | |
| Methyl methacrylate | 10.4 | 36.2 | 11.6 | 87.4 | | 10.4 |
| 2-hydroxyethyl methacrylate | 8.6 | 8.6 | | | | 8.6 |
| Glycidyl methacrylate | | | | | 11.3 | |
| Glass transition temperature Tg (° C.) as calculated | 114 | 92 | 116 | 106 | 113 | 114 |
| Mass ratio of composite fluorinated copolymer/methacrylate resin | 77/23 | 77/23 | 78/22 | 77/23 | 80/20 | 77/23 |

Example 1

Production of Powder Coating Composition

While stirring the aqueous dispersion of Preparation Example 6, a 10% aqueous solution of potassium chloride was added to agglomerate and precipitate the composite fluorinated copolymer. This agglomerated precipitate was subjected to filtration by a glass filter, and then, washing with deionized water, followed by filtration, was repeated. The obtained granular polymer was dried for 12 hours in an oven of 50° C.

138 Parts of this composite fluorinated copolymer, 15.0 parts of Adduct B-1530 (tradename for a blocked isocyanate, manufactured by Huls Company), 0.5 part of Modaflow 2000 (tradename for a leveling agent for an acrylic polymer, manufactured by Monsanto Ltd.), 2 parts of TINUVIN 900 (tradename for a benzotriazole type ultraviolet absorber, manufactured by Ciba Geigy Company), and 0.7 part of TINUVIN 144 (tradename for a hindered amine type photostabilizer, manufactured by Ciba Geigy Company), were mixed for about one minute by a Henschel mixer (tradename for a dry blender manufactured by Mitsui Kakoki K.K.), followed by melt-kneading under a temperature condition of from 90 to 130° C. by means of an extrusion kneading machine Buss-Koneader PR-46 (manufactured by Pusu Company).

Then, this melt-kneaded product was cooled to 20° C. and then pulverized by an impact hammer mill and sieved through a 80 mesh metal net to obtain a heat curable fluororesin powder coating composition.

The obtained powder coating composition was applied by electrostatic spray coating to a steel plate treated by zinc phosphate treatment and heated and cured for 20 minutes in an oven of 180° C. to obtain a coated product. With respect to the obtained coated product and the coating film, evaluation tests were carried out with respect to the following items, and the results are shown in Table 3.

(a) Blocking Resistance

With respect to the coating composition after storage at 40° C. for 7 days, evaluation was carried out under the following standards.

○: No blocking was observed.

Δ: Blocks observed but can not be pinched by fingers.

X: Blocks which can be pinched by fingers, observed.

(b) Appearance of the Coating Film (Smoothness)

The surface state of the coating film was visually evaluated.

○: No abnormality observed.

Δ: Slight seeding observed.

X: Substantial seeding observed.

(c) Gloss (60°)

In accordance with JIS K5400 7.6.

Examples 2 to 5 and Comparative Examples 1 to 3

The operation was carried out in the same manner as in Example 1 except that the powder coating composition as identified in Table 2 was coated under the respective conditions as identified in the Table. The results are shown in the Table 3.

TABLE 2

| Names | of materials | Example No. 1 | 2 | 3 | 4 | 5 | Comparative Example No. 1 | 2 | 3 |
|---|---|---|---|---|---|---|---|---|---|
| Fluorinated copolymer | Preparation Ex. 6 | 137 | | | | | | | |
| | Preparation Ex. 7 | | 138 | | | | | | |
| | Preparation Ex. 8 | | | 141 | | | | | |
| | Preparation Ex. 9 | | | | 139 | | | | |
| | Preparation Ex. 10 | | | | | 137 | | | |
| | Preparation Ex. 1 | | | | | | 137 | | |
| | Preparation Ex. 4 | | | | | | | 138 | |
| | Preparation Ex. 11 | | | | | | | | 137 |
| Curing agent | Adduct B-1530 | 15.0 | | | | | 15.0 | | 15.0 |
| | Adduct BF-1540 | | 15.0 | | | | | | |
| Additives | Modaflow 2000 | 0.5 | 0.5 | 0.5 | 0.5 | 0.5 | 0.5 | 0.5 | 0.5 |
| | Benzoin | 0.5 | 0.5 | 0.5 | 0.5 | 0.5 | 0.5 | 0.5 | 0.5 |
| | Titanium oxide | 30 | 30 | 30 | 30 | 30 | 30 | 30 | 30 |
| Coating conditions | Baking temperature (° C.) | 180 | 180 | 160 | 160 | 160 | 180 | 160 | 160 |
| | Baking time (min) | 20 | 20 | 20 | 20 | 20 | 20 | 20 | 20 |

Adduct B-1530: ε-caprolactam-blocked isocyanate curing agent, manufactured by Huls Company
Adduct BF-1540: Urethodion curing agent, manufactured by Huls Company
Modaflow 2000: Leveling agent, manufactured by Monsanto Ltd.

TABLE 3

| | Example No. 1 | 2 | 3 | 4 | 5 | Comparative Example No. 1 | 2 | 3 |
|---|---|---|---|---|---|---|---|---|
| Blocking resistance | ○ | ○ | Δ | Δ | ○ | X | X | X |
| Appearance of coating film | ○ | ○ | ○ | ○ | ○ | X | Δ | X |
| Gloss | 108 | 120 | 104 | 105 | 109 | 103 | 110 | 98 |

INDUSTRIAL APPLICABILITY

In the fluororesin powder coating composition of the present invention, as the main material resin, a composite fluorinated copolymer having a core/shell structure wherein a fluorinated copolymer having a relatively low Tg is covered with a resin having a high Tg, is used, so that a coating composition can be presented whereby blocking resistance during storage is high, and smoothness of the coating film when coated, is high.

Further, in the present invention, bonds are formed between cores and shells by introducing functional groups which mutually react to each other, to the fluorinated copolymer constituting cores and to the resin constituting the shells, respectively, whereby peeling or disintegration of the core/shell structure during melt-kneading of the coating composition is substantially suppressed, and thus, a coating composition superior in blocking resistance can be presented.

The entire disclosure of Japanese Patent Application No. 2001-324668 filed on Oct. 23, 2001 including specification, claims and summary is incorporated herein by reference in its entirety.

What is claimed is:

1. A fluororesin powder coating composition comprising a composite fluorinated copolymer (A) having a core/shell structure wherein core particles comprise a fluorinated copolymer (A'), and their surfaces are covered with a resin having a glass transition temperature higher than that of the core particles, constituting shells, wherein the glass transition temperature of the core particles of the composite fluorinated copolymer (A) is from −40 to 50° C., and the glass transition temperature of the resin constituting the shells is from 60 to 150° C., wherein the resin constituting the shells comprises a (meth)acrylate resin, and wherein the composite fluorinated copolymer (A) is a powder obtained by emulsion-polymerizing, in the presence of the fluorinated copolymer (A') containing a polymerized units based on (a) fluoroolefin and polymerized units based on (b) a vinyl monomer having at least one reactive functional group selected from the group consisting of a carboxyl group, an expoxy group, a hydrolysable silyl group, a hydroxyl group and an amino group, a radical polymerizable monomer mixture comprising (e) a (meth)acrylate having a reactive group which reacts with the reactive group of the above (b), to form a bond, thereby to obtain an aqueous dispersion of a composite fluorinated copolymer (A), and separating and drying the composite fluorinated copolymer (A) from the aqueous dispersion.

2. Particles for a powder coating material, comprising a composite fluorinated copolymer (A) having a core/shell structure wherein core particles comprise a fluorinated copolymer (A'), and their surfaces are covered with a resin having a glass transition temperature higher than that of the core particles, constituting shells, wherein the glass transition temperature of the core particles of the composite fluorinated copolymer (A) is from −40 to 50° C., and the glass transition temperature of the resin constituting the shells is from 60 to 150° C., wherein the resin constituting the shells comprises a (meth)acrylate resin, and wherein the composite fluorinated copolymer (A) is a powder obtained by emulsion-polymerizing, in the presence of the fluorinated copolymer (A') containing polymerized units based on (a) a fluoroolefin and polymerized units based on (b) a vinyl monomer having at least one reactive functional group selected from the group consisting of a carboxyl group, an epoxy group, a hydrolysable silyl group, a hydroxyl group and an amino group, a radical polymerizable monomer mixture comprising (e) a (meth)acrylate having a reactive group which reacts with the reactive group of the above (b), to form a bond, thereby to obtain an aqueous dispersion of a composite fluorinated copolymer (A), and separating and drying the composite fluorinated copolymer (A) from the aqueous dispersion.

3. The composition according to claim 1, wherein fluororesin (a) comprises tetrafluoroethylene.

4. The composition according to claim 1, wherein the glass transition temperature of the core particles of the composite fluorinated copolymer (A) is from −20 to 40° C., and the glass transition temperature of the resin constituting the shells is from 70 to 130° C.

5. The composition according to claim 1, wherein the reactive functional group of vinyl monomer (b) comprises a carboxyl group.

6. The composition according to claim 5, wherein vinyl monomer (b) comprises 10-undecenoic acid.

7. The composition according to claim 1, wherein the reactive functional group of vinyl monomer (b) comprises an epoxy group.

8. The composition according to claim 1, wherein the reactive functional group of vinyl monomer (b) comprises a hydrolysable silyl group.

9. The composition according to claim 1, wherein the reactive functional group of vinyl monomer (b) comprises a hydroxyl group.

10. The composition according to claim 1, wherein the reactive functional group of vinyl monomer (b) comprises an amino group.

11. The particles according to claim 2, wherein fluororesin (a) comprises tetrafluoroethylene.

12. The particles according to claim 2, wherein the glass transition temperature of the core particles of the composite fluorinated copolymer (A) is from −20 to 40° C., and the glass transition temperature of the resin constituting the shells is from 70 to 130° C.

13. The particles according to claim 2, wherein the reactive functional group of vinyl monomer (b) comprises a carboxyl group.

14. The particles according to claim 13, wherein vinyl monomer (b) comprises 10-undecenoic acid.

15. The particles according to claim 2, wherein the reactive functional group of vinyl monomer (b) comprises an epoxy group.

16. The particles according to claim 2, wherein the reactive functional group of vinyl monomer (b) comprises a hydrolysable silyl group.

17. The particles according to claim 2, wherein the reactive functional group of vinyl monomer (b) comprises a hydroxyl group.

18. The particles according to claim 2, wherein the reactive functional group of vinyl monomer (b) comprises an amino group.

* * * * *